United States Patent [19]

Schofield et al.

[11] Patent Number: 5,236,474
[45] Date of Patent: Aug. 17, 1993

[54] MEMBRANE-BASED REMOVAL OF CONDENSABLE VAPORS

[75] Inventors: Richard W. Schofield, Maroubra, Australia; David D. Newbold, Bend, Oreg.; Scott B. McCray, Bend, Oreg.; Dwayne T. Friesen, Bend, Oreg.; Roderick J. Ray, Bend, Oreg.

[73] Assignee: Bend Research, Inc., Bend, Oreg.

[21] Appl. No.: 942,679

[22] Filed: Sep. 9, 1992

Related U.S. Application Data

[63] Continuation-in-part of Ser. No. 759,458, Sep. 13, 1991.

[51] Int. Cl.[5] .................. B01D 53/22; B01D 69/08
[52] U.S. Cl. ......................................... 95/47; 95/48; 95/50; 95/52; 96/10
[58] Field of Search ............. 55/16, 68, 158, 267–269, 55/23

[56] References Cited

U.S. PATENT DOCUMENTS

| | | | |
|---|---|---|---|
| 2,433,741 | 12/1947 | Crawford | 55/16 |
| 2,506,656 | 5/1950 | Wallach et al. | 55/16 |
| 2,583,601 | 1/1952 | Schwartz | 55/16 X |
| 3,420,069 | 1/1969 | Booth | 55/16 X |
| 3,566,580 | 3/1971 | Li | 55/16 |
| 3,629,075 | 12/1971 | Gutbier | 55/16 X |
| 4,218,312 | 8/1980 | Perry | 55/16 X |
| 4,239,507 | 12/1980 | Benoit et al. | 55/16 |
| 4,268,279 | 5/1981 | Shindo et al. | 55/16 |
| 4,311,594 | 1/1982 | Perry | 55/16 X |
| 4,553,983 | 11/1985 | Baker | 55/16 |
| 4,583,996 | 4/1986 | Sakata et al. | 55/16 |
| 4,659,343 | 4/1987 | Kelly | 55/16 |
| 4,873,835 | 10/1989 | Rojey et al. | 55/16 X |
| 4,900,448 | 2/1990 | Bonne et al. | 55/16 X |
| 4,929,357 | 5/1990 | Schucker | 55/16 X |
| 4,954,145 | 9/1990 | Thakore et al. | 55/16 |
| 5,002,590 | 3/1991 | Friesen et al. | 55/16 |
| 5,034,025 | 7/1991 | Overmann, III | 55/16 |
| 5,045,206 | 9/1991 | Chen et al. | 55/16 X |
| 5,084,073 | 1/1992 | Prasad | 55/16 |
| 5,108,464 | 4/1992 | Friesen et al. | 55/16 |
| 5,127,926 | 7/1992 | Baker et al. | 55/16 |
| 5,160,511 | 11/1992 | Lovelock | 55/16 |

FOREIGN PATENT DOCUMENTS

WO91/06363 5/1991 PCT Int'l Appl. .............. 55/16

*Primary Examiner*—Robert Spitzer
*Attorney, Agent, or Firm*—Chernoff, Vilhauer, McClung & Stenzel

[57] ABSTRACT

A process for removing and recovering a condensable vapor from a gas stream by a membrane contactor is disclosed wherein a gas stream containing a condensable vapor is circulated on one side of hollow fiber membranes while cool extraction fluid is circulated on the other side under a total pressure differential, thereby condensing the condensable vapor in the gas stream, the condensed vapor permeating the membrane and becoming entrained in the cool extraction fluid.

26 Claims, 2 Drawing Sheets ered a condensable vapor from a gas stream simply and
efficiently without the use of compressors. This object
and others are met by the present invention, which is
summarized and described in detail below.

MEMBRANE-BASED REMOVAL OF CONDENSABLE VAPORS

The government has a nonexclusive, nontransferable, royalty-free license to practice certain aspects of this invention under Contract No. NAS2-13345 awarded by the National Aeronautics and Space Administration.

This is a continuation-in-part of application Ser. No. 07/759,458, filed Sept. 13, 1991.

BACKGROUND OF THE INVENTION

This invention relates to the removal and recovery of condensable vapors from a gas stream. Many industrial processes produce gas streams containing condensable vapors, such as water vapor and volatile organics. Typically, it is desirable to remove and recover these condensable vapors from the gas stream for environmental or economic reasons.

Processes for removing condensable vapors from gas streams are known. Merten, in U.S. Pat. No. 4,466,202, discloses a process for separating a condensable gas from a non-condensable gas by preferentially passing the vapor through a semipermeable membrane. The condensable gas is then compressed using a vacuum compressor and subsequently condensed in a heat exchanger, permitting the recovery of the condensate, as well as recovery of the latent heat of condensation. However, the use of a vacuum compressor makes this process somewhat energy-intensive, and requires high capital costs for the vacuum compressor. Baker, in U.S. Pat. No. 4,553,983 discloses essentially the same process for recovering and concentrating organic vapors from a feed stream of air having an organic vapor concentration of no more than 20,000 ppm by volume. This process suffers from the same drawbacks.

The use of refrigeration to condense a vapor from a feed gas stream is well known in the art. Feed gas is compressed and cooled below the dewpoint of the condensable component of the feed gas. However, the removal efficiency of this process is limited since the dewpoint of the feed gas can only be cooled to the temperature of the cooling medium used in the refrigeration system. Wijmans, in PCT Application No. WO 91/06363, discloses a hybrid process combining refrigeration/condensation with the membrane process discussed above. Although the hybrid process is an improvement on the individual processes, it still suffers from the same inherent drawbacks as the membrane process.

It is therefore an object of the present invention to provide an improved method for removing and recovering a condensable vapor from a gas stream simply and efficiently without the use of compressors. This object and others are met by the present invention, which is summarized and described in detail below.

SUMMARY OF THE INVENTION

The present invention is a process for removing and recovering a condensable vapor from a gas stream comprising:
(a) providing a hollow fiber membrane having a feed side and a permeate side;
(b) contacting the feed side of the membrane with a gas stream containing a condensable vapor;
(c) contacting the permeate side of the membrane with a cool extraction fluid, the total pressure on the permeate side being less than the total pressure on the feed side; and
(d) entraining in said cool extraction fluid on the permeate side condensed vapor from said gas stream.

The basic process may be complemented with a condensed vapor separation step, an extraction fluid recycling step, or a step whereby extraction fluid is removed from the alternative recycling step at a rate equal to the rate of entrainment of the condensed vapor.

DETAILED DESCRIPTION OF THE INVENTION

According to the present invention, there is provided a simple, energy-efficient process for removing and recovering condensable vapors from a gas stream. The essence of the invention lies in using a cool extraction fluid as both a heat extraction and an entrainment fluid on the permeate side of a membrane while the other (feed) side of the membrane is in contact with the gas stream containing the condensable vapor, and maintaining a lower total pressure on the permeate side than on the feed side. The permeate side extraction fluid serves as a heat sink to absorb sensible and latent heat removed from the gas stream containing the condensable vapor. The sensible heat absorbed has the effect of lowering the temperature of the feed gas that is in direct contact with the membrane surface. When the gas that is in direct contact with the membrane is cooled past its dewpoint, vapor condenses from the gas stream, the vapor and latent heat from this condensation being entrained in the membrane wall. The extraction fluid is throttled at the inlet to maintain a pressure lower than that of the warm feed gas stream to provide the driving force for the captured condensate to permeate the membrane wall from the outer surface where it initially condenses, to the interior where the bulk of the extraction fluid is being circulated. Note that the driving force for transport of the condensate across the membrane in the present invention is the total pressure across the membrane. This total pressure difference induces bulk flow of liquid through the membrane rather than simple diffusion which takes place when there is only a partial pressure differential as in prior art processes.

Figure 1:
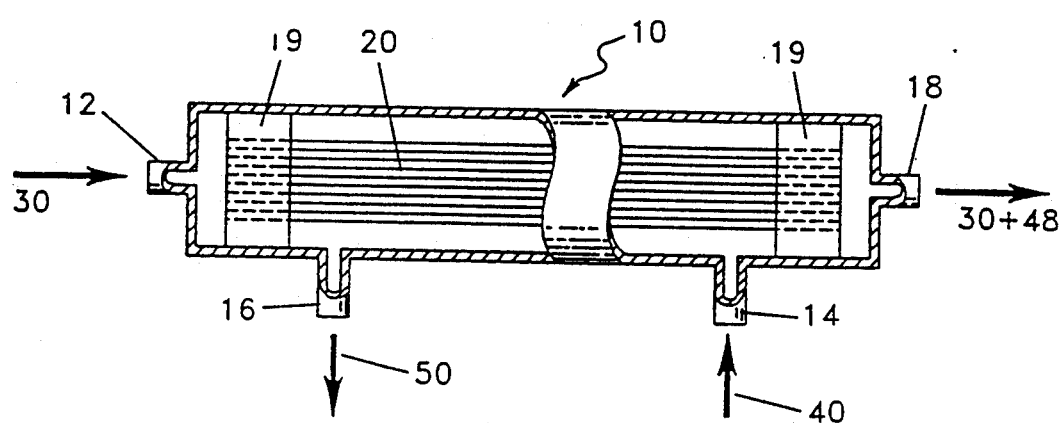
FIG. 1 is a schematic illustrating an exemplary embodiment of the invention employing a hollow fiber module.

The process is illustrated in the schematic drawings, wherein like numerals refer to the same elements. In FIG. 1 there is shown a module 10 having a cool extraction fluid inlet port 12, a warm moist feed gas inlet port 14, a cooled dry gas outlet port 16, and a retentate or combined extraction fluid condensate outlet port 18. The module 10 contains a multiplicity of hollow fibers 20, the ends of which are secured in mating relationship to the two ends of the module by potting compound 19. Cool extraction fluid 30 is conducted into inlet port 12 and thence through the lumens 2 of the hollow fibers 20. Warm moist feed gas 40 is fed into inlet port 14 so as to be in contact with the outside or "shell" side of the hollow fibers 20. Cool extraction fluid and entrained water vapor condensate 48 exit the module via outlet port 18, while cool dry gas 50 exits via outlet port 16.

Figure 2:
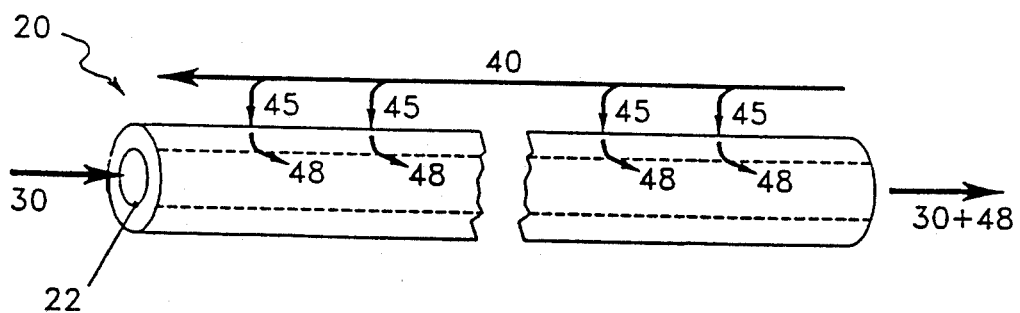
FIG. 2 is a schematic of the process of the invention in a single hollow fiber of the module shown in FIG. 1.

In FIG. 2, which is a schematic of the process in a single hollow fiber, cool extraction fluid 30 is shown entering the lumen 22 of fiber 20, while warm moist feed gas 40 is shown flowing countercurrently on the outside of the fiber. Water vapor 45 from the warm moist air 40 is shown being drawn into the hollow fiber membrane wall and permeating therethrough and condensing as water vapor condensate 48, which is entrained into the cool water stream 30.

Figure 3:
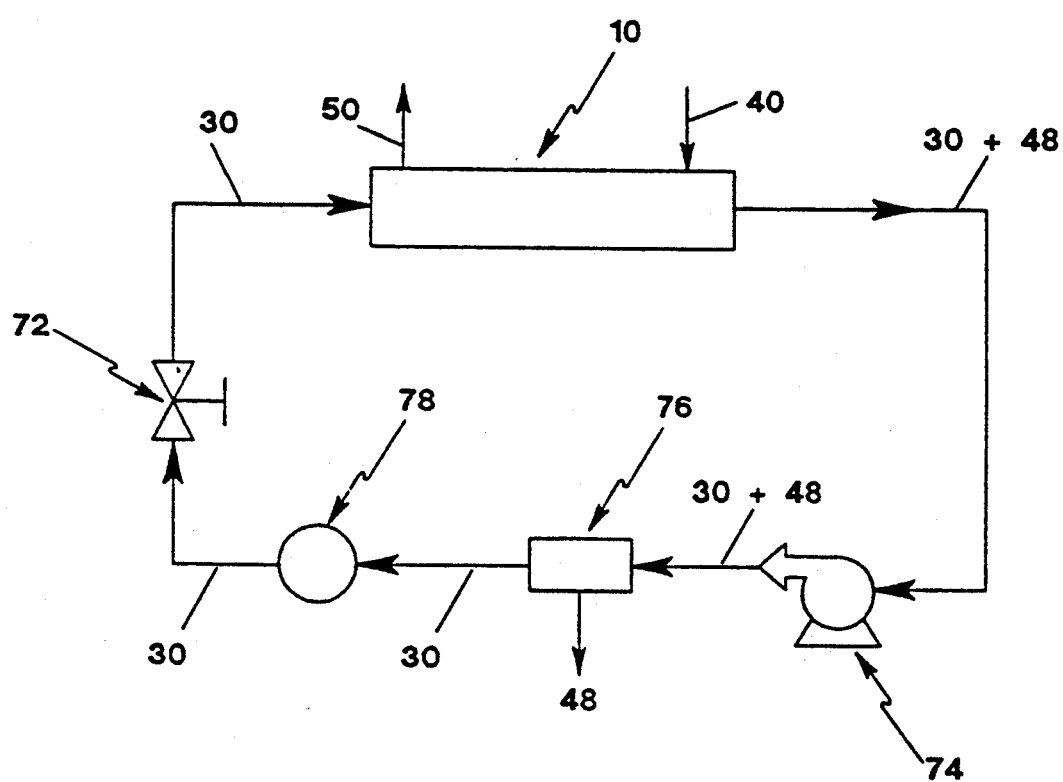
FIG. 3 is a schematic illustrating an exemplary embodiment of the invention.

In FIG. 3, low-pressure extraction fluid 30 is shown entering the hollow fiber module 10. The extraction fluid 30 and condensate 48 exit the hollow fiber module 10, and are directed to liquid circulation pump 74, where the extraction fluid 30 and condensate 48 are pressurized. The pressurized extraction fluid and condensate are directed to a separation device 76 that separates the pressurized extraction fluid 30 and condensate 48 into substantially pure condensate 48 and substantially pure extraction fluid 30. The substantially pure extraction fluid 30 is then cooled to the desired operating temperature in heat exchanger 78. The cool extraction fluid 30 is then directed to a throttle valve 72, producing a low pressure extraction fluid 30, which is recycled to the feed side of hollow fiber module 10.

By "condensable vapors" is meant fluids below their critical temperature and having boiling points greater than about $-100°$ C. For a stream containing a mixture of two or more condensable components, the term condensable vapor refers to the more readily condensable component or components. Examples of condensable vapors include vapors of the following: chlorofluorocarbons such as Freons and Halons; chlorinated hydrocarbons, such as methylene chloride, trichloroethylene, trichloroethane, carbon tetrachloride, chlorobenzene; non-chlorinated hydrophobic organics, such as benzene, toluene, xylene, ethyl benzene, cyclohexane, propane, butane, hexane, and octane; non-chlorinated hydrophilic organics, such as ethanol, methanol, other alcohols, acetone, ethyl acetate, methyl ethyl ketone, methyl t-butyl ketone, nitrobenzene, phenols, cresols, triethyleamine, acetonitrile, dimethyl formamide, and dimethylacetamide; and inorganic compounds, such as water and ammonia.

The hollow fiber membrane is preferably either "nonporous" (i.e., having a dense "skin" on the one side of the membrane) or microporous, with pores $\leq 0.1$ micron in diameter. When the condensable vapor is hydrophilic, the hollow fiber membrane is preferably also hydrophilic. Particularly preferred hydrophilic membranes are those of cellulose acetate, regenerated cellulose, polyimide, polyamide, polymethacrylates, polyvinylalcohol, polyethylacetate, and polyacrylonitrile. When the condensable vapor is hydrophobic, the hollow fiber membrane is preferably also hydrophobic. Particularly preferred hydrophobic membranes are those of silicone rubber, butyl rubber, natural rubber, polysulfone, polyethersulfone, silicone-rubber coated polysulfone, polyvinylchloride, tygon, polyarylene ethers, substituted polyacetylenes, polyurethane, hydrophobic polyimides, polyethylene, polypropylene, polybutylene, polyisoprene, polybutadiene, polytetrafluoroethylene, polyvinylidene fluoride, polyvinylidine chloride, polyhexafluoro propylene, polystyrene, and copolymers thereof. The walls of the hollow fiber membranes preferably have a thickness of 5-500 microns and an inside diameter or lumen of at least 50 microns, but less than 10,000 $\mu$m. The feed gas stream may be any non-condensable gas. Examples include air, nitrogen, hydrogen, methane, helium, and argon. The feed gas stream may also be a mixture of two condensable vapors as described above, in which one component is more readily condensed; in such a case, the more readily condensed component is considered the condensable vapor while the other component is considered the feed gas.

The extraction fluid may be any fluid that does not chemically react with the condensable vapor, the feed gas, the hollow fiber membrane, or the module materials. The extraction fluid may be either miscible or immiscible with the condensable vapor, most preferably miscible with the condensable vapor. The boiling point of the extraction fluid may be either higher or lower than that of the condensable vapor, most preferably higher. In some applications, the extraction fluid may simply be a liquid form of the condensable vapor. Examples of extraction fluids include: hydrophilic compounds, such as water, ethylene glycol, polyethylene glycol, propylene carbonate, glycerol, acetonitrile, dimethylacetamide, stearic acid, octanol, phenol, and cresols; and hydrophobic compounds, such as dodecane, silicone oil, petroleum naphtha, and other petroleum products.

The process for separating the condensate from the extraction fluid may be any process that adequately performs the separation. Generally, the separation should produce a substantially pure condensate containing less than 10% extraction fluid and a substantially pure extraction fluid containing less than 10% condensate. Examples of suitable separation processes include distillation, vacuum distillation, membrane distillation, evaporation, vacuum evaporation, liquid/liquid extraction, phase separation (decantation), crystallization, adsorption, reverse osmosis, nanofiltration, and pervaporation. In cases where the extraction fluid is simply the liquid form of the condensable vapor, the separation operation may involve simply draining a portion of the extraction fluid/condensate from the recirculation loop at a rate equal to the rate that the condensable vapor is entrained into the extraction fluid.

Although a countercurrent mode of operation is depicted in FIGS. 1–3, both crossflow and coflow will also work in the process of the present invention.

The pressure differential between the feed and permeate sides of the hollow fiber membrane should be in the range of 0.001 to 1 atm, preferably 0.01 to 0.8 atm. Pressure of the cool extraction fluid on the permeate side of the membrane is preferably 0.01–0.99 atm, and pressure drop along the length of a hollow fiber membrane should not exceed 0.8 atm. Pressure drop of the feed gas stream through the module should not exceed 0.05 atm, while the feed rate should be 0.001–1 $Nm^3/m^2$-min.

The temperature differential between the dewpoint of the warm moist feed gas and the cool extraction fluid/condensate is preferably at least 1° C.

EXAMPLE 1

A warm moist feed gas comprising air laden with water vapor at a dry bulb temperature of 23° C. and a dewpoint of 18° C. was fed at ambient pressure (1 atm) at the rate of 0.006 $Nm^3/m^2$-min to a 1 $m^2$ hollow fiber module in substantially the same configuration as that shown in FIG. 1, the membrane comprising 7050 regenerated cellulose hollow fibers with an OD of 230 microns, a wall thickness of 7 microns, and lumens of 215 microns (Model CF 15-11 Baxter Healthcare Corp. of Deerfield, Ill.). Pressure drop of the warm air feed through the module was 0.03 atm. An extraction fluid comprising cool water at 8° C. and 0.96 atm was drawn through lumens of the hollow fiber membranes at 250 ml/min. The combined cooling water and condensed vapor stream exiting the module was measured at steady state to be 8° C. and 0.9 atm, while the cooled, dehumidified air exiting the module was measured at steady state to have a dry bulb temperature of 12° C. and a dewpoint temperature of 8° C.

EXAMPLE 2

A warm moist feed gas comprising air laden with water vapor at a dry bulb temperature of 21° C. and a dewpoint of 18° C. was fed at ambient pressure (1 atm) at the rate of 0.01 Nm$^3$/m$^2$-min to a 0.06 m$^2$ hollow fiber module in substantially the same configuration as that shown in FIG. 1, the membrane comprising microporous cellulose acetate hollow fibers with lumens of 600 microns (manufactured by Microgon of Los Angeles, Calif.). An extraction fluid comprising water at 8° C. and 0.96 atm was drawn through the lumens of the hollow fiber membranes at 850 ml/min. The combined cooling water and condensed vapor stream exiting the module was measured at steady state to be 8° C. and 0.9 atm, while the cooled, dehumidified air exiting the module was measured at steady state to have a dry bulb temperature of 8° C. and a dewpoint temperature of 7° C.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed:

1. A process for removing and recovering a condensable vapor from a gas stream comprising the steps:
   (a) providing at least one hollow fiber membrane having a feed side and a permeate side;
   (b) contacting the feed side of said membrane with a gas stream containing a condensable vapor;
   (c) contacting the permeate side of said membrane with a cool extraction fluid, the total permeate side pressure being less than the total feed side pressure said total permeate side pressure being maintained by throttling said cool extraction fluid with a throttle valve after said fluid has been pressurized with a liquid circulation pump and prior to contact with said permeate side; and
   (d) entraining in said cool extraction fluid on the permeate side condensed vapor from said gas stream.

2. The process of claim 1 including removing said condensed vapor from said cool extraction fluid.

3. The process of claim 2 including forming a recycle stream by recycling said cool extraction fluid to the permeate side of said membrane in step (c).

4. The process of claim 3 wherein the method for removing said condensed vapor from said cool extraction fluid comprises removing condensed vapor from said recycle stream at a rate equal to the rate at which condensed vapor is entrained in said cool extraction fluid.

5. The process of claim 2 wherein the method for removing said condensed vapor from said extraction fluid is selected from the group consisting of distillation, vacuum distillation, membrane distillation, evaporation, vacuum evaporation, liquid/liquid extraction, phase separation, crystallization, adsorption, reverse osmosis, nanofiltration, and pervaporation.

6. The process of claim 1 wherein said feed side is the outside of said hollow fiber and said permeate side is the lumen of said hollow fiber.

7. The process of claim 1 wherein said condensable vapor is selected from the vapors of the group consisting of chlorofluorocarbons, chlorinated hydrocarbons, non-chlorinated hydrophobic organics, non-chlorinated hydrophilic organics, and inorganic compounds.

8. The process of claim 7 wherein said chlorinated hydrocarbons are selected from the group consisting of methylene chloride, trichloroethylene, trichloroethane, carbon tetrachloride, and chlorobenzene.

9. The process of claim 7 wherein said non-chlorinated hydrophobic organics are selected from the group consisting of benzene, toluene, xylene, ethyl benzene, cyclohexane, propane, butane, hexane, and octane.

10. The process of claim 7 wherein said non-chlorinated hydrophilic organics are selected from the group consisting of ethanol, methanol, phenols, cresols, acetone, ethyl acetate, methyl ethyl ketone, methyl t-butyl ketone, nitrobenzene, triethyleamine, acetonitriles, dimethyl formamide, and dimethylacetamide.

11. The process of claim 7 wherein said inorganic compounds are selected from the group consisting of water and ammonia.

12. The process of claim 1 wherein said hollow fiber membrane is nonporous.

13. The process of claim 1 wherein said hollow fiber membrane is microporous.

14. The process of claim 1 wherein said hollow fiber membrane is hydrophilic.

15. The process of claim 14 said hollow fiber membrane is selected from the group consisting of cellulose acetate, regenerated cellulose, polyimide, polyamide, polymethacrylates, polyvinylalcohol, polyethylacetate, and polyacrylonitrile.

16. The process of claim 1 wherein said hollow fiber membrane is hydrophobic.

17. The process of claim 16 wherein said hollow fiber membrane is selected from a group consisting of polysulfone, polyethersulfone, silicone-rubber coated polysulfone, silicone rubber, natural rubber, butyl rubber, polyvinylchloride, tygon, polyarylene ethers, substituted polyacetylenes, polyurethane, hydrophobic polyimides, polyethylene, polypropylene, polybutylene, polyisoprene, polybutadiene, polytetrafluoroethylene, polyvinylidene fluoride, polyvinylidine chloride, polyhexafluoro propylene, polystyrene, and copolymers thereof.

18. The process of claim 1 wherein said cool extraction fluid is selected from the group consisting of hydrophilic and hydrophobic compounds.

19. The process of claim 18 wherein said cool extraction fluid is a hydrophilic compound and is selected from the group consisting of water, glycerol, ethylene glycol, polyethylene glycol, propylene carbonate, acetonitrile, dimethylacetamide, stearic acid, octanol, phenols, and cresols.

20. The process of claim 18 wherein said cool extraction fluid is a hydrophobic compound and is selected from the group consisting of dodecane, silicone oil, and petroleum naphtha.

21. The process of claim 1 wherein said cool extraction fluid comprises a mixture of compounds.

22. The process of claim 1 wherein said cool extraction fluid consists essentially of the liquid form of said condensable vapor.

23. The process of claim 1 wherein the difference in temperature between said cool extraction fluid and said feed gas is at least 1° C.

24. The process of claim 1 wherein the difference in pressure between said permeate side and said feed side is from 0.001 to 1 atm.

25. The process of claim 1 wherein said feed gas and said cool extraction fluid flow in opposite directions.

26. The process of claim 1 wherein said feed gas is air, said condensable vapor is water vapor, and said cool extraction fluid is water.

* * * * *

UNITED STATES PATENT AND TRADEMARK OFFICE
CERTIFICATE OF CORRECTION

PATENT NO. : 5,236,474

DATED : August 17, 1993

INVENTOR(S) : Richard Schofield, David Newbold, Scott McCray, Dwayne Friesen and Roderick J. Ray It is certified that error appears in the above-identified patent and that said Letters Patent is hereby corrected as shown below:

Column 2, Line 63: Delete "2" after lumens and insert -- 22 --.

Column 6, Line 38: After "claim 14" insert -- wherein --.

Signed and Sealed this

Second Day of August, 1994

Attest:

BRUCE LEHMAN

Attesting Officer

Commissioner of Patents and Trademarks